April 7, 1959 G. E. NICHOLS 2,880,948
DISPLAY MOUNT PROVIDED WITH BRACE MEMBERS
Filed March 17, 1954 3 Sheets-Sheet 1
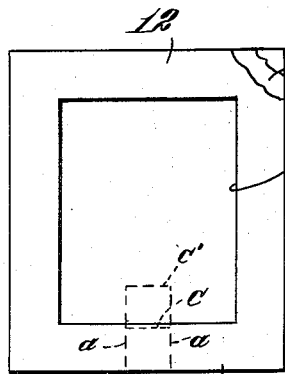
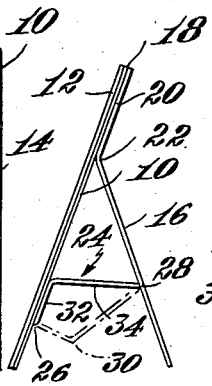
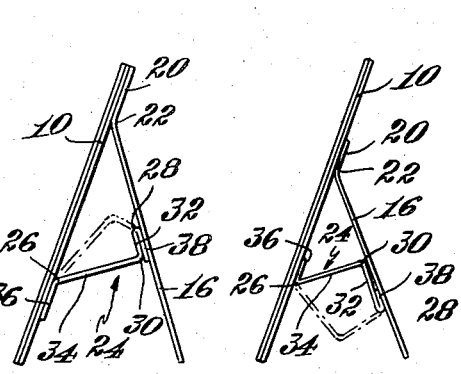
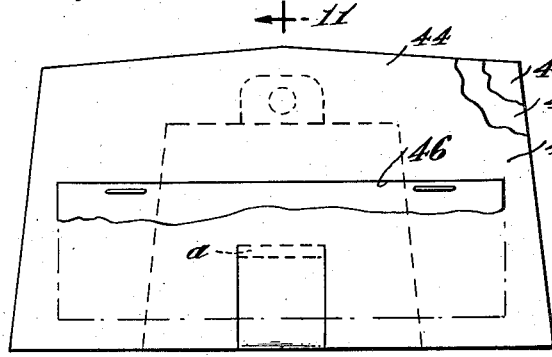
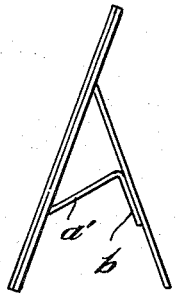
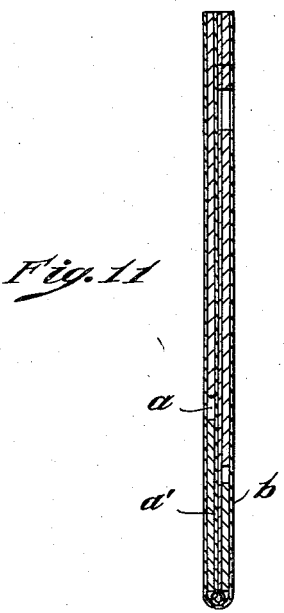
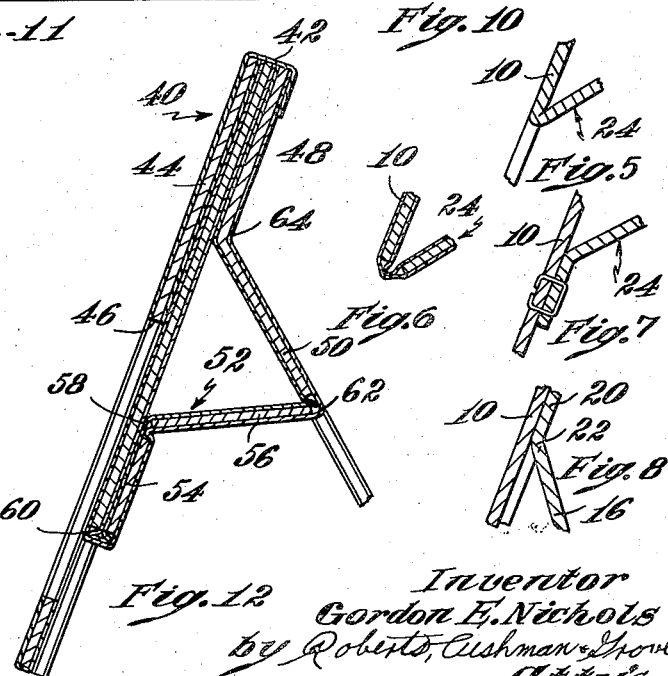
Inventor
Gordon E. Nichols
by Roberts, Cushman & Grover
Atty's

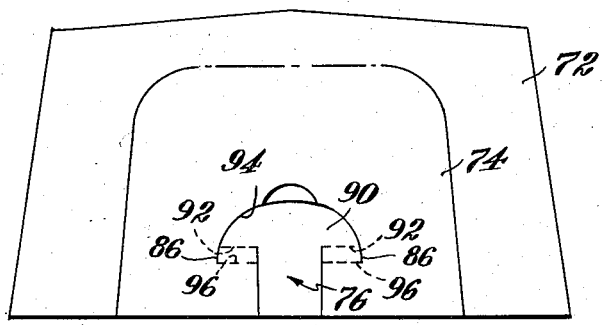
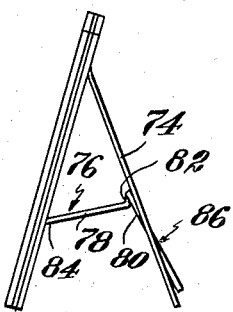
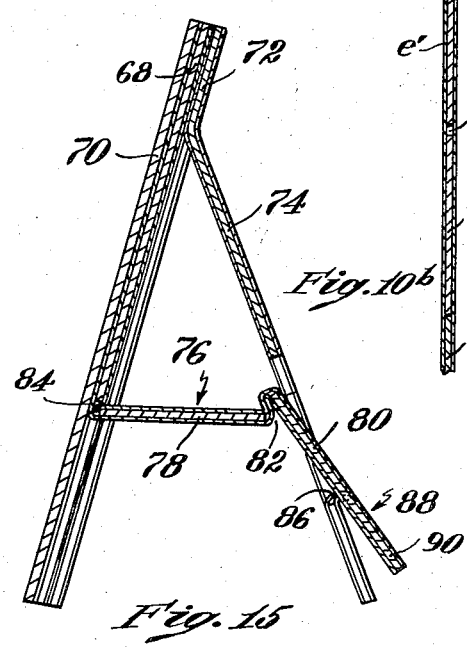
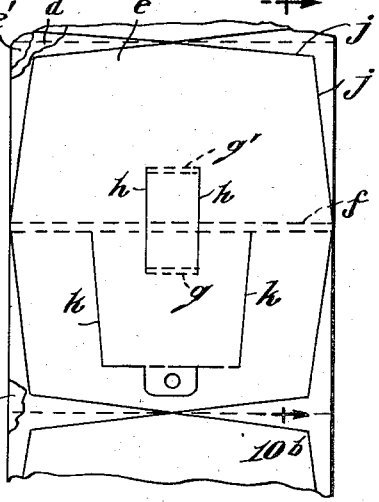
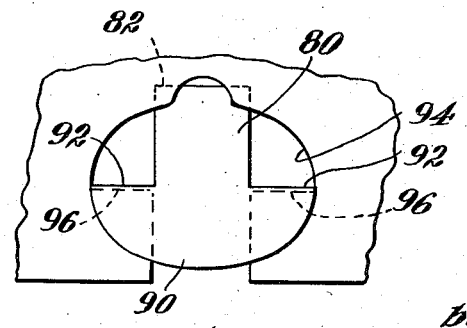
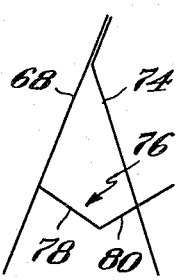
Inventor
Gordon E. Nichols
by Roberts, Cushman & Grover
Atty's April 7, 1959 G. E. NICHOLS 2,880,948
DISPLAY MOUNT PROVIDED WITH BRACE MEMBERS
Filed March 17, 1954 3 Sheets-Sheet 3
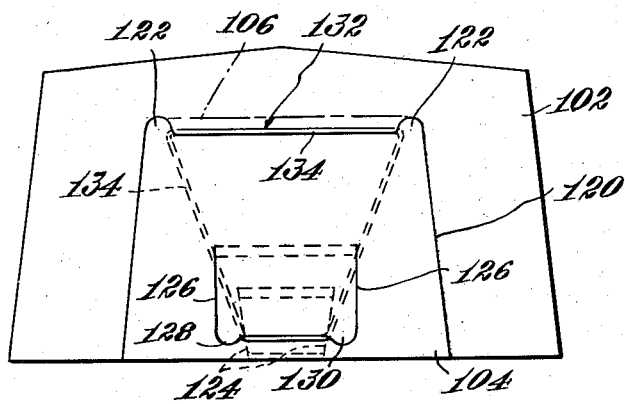
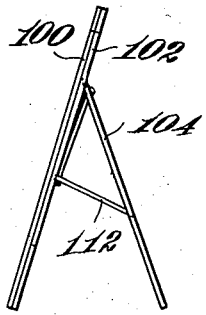
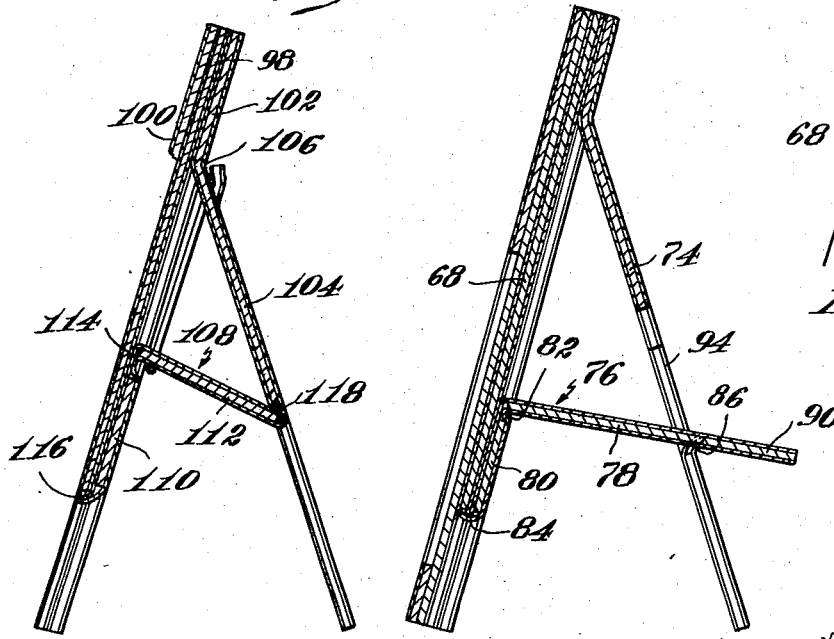
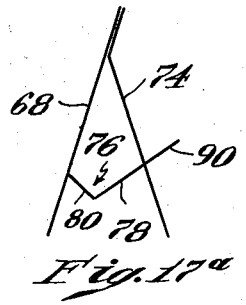
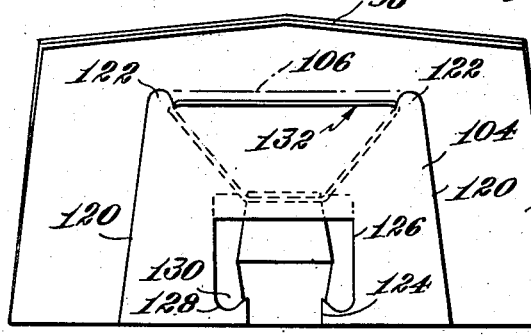
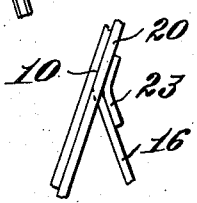
Inventor
Gordon E. Nichols
by Roberts, Cushman & Grover
Atty's

United States Patent Office 2,880,948
Patented Apr. 7, 1959

2,880,948

DISPLAY MOUNT PROVIDED WITH BRACE MEMBERS

Gordon E. Nichols, Middleboro, Mass., assignor to Winthrop-Atkins Co., Inc., Middleboro, Mass., a corporation of Massachusetts Application March 17, 1954, Serial No. 416,833

7 Claims. (Cl. 248—35)

This invention relates to display mounts for holding photographs, calendars and the like and more particularly to mounts of the easel kind adapted to be set up on a desk or table.

The objects of this invention are to provide an easel type mount having a frame for a photograph or calendar pad, and a supporting leg arranged to be held in diverging relation thereto by a brace which is specially designed to make it easier to set the mount up for use and yet has the advantage when collapsed that the easel will lie perfectly flat, thus being favorable to folding for shipping, storage and the like. Other objects are to provide an easel type mount which resists accidental collapse once it is set up so that barring mutilation or destruction of the mount, the brace will remain in its operative position until it is manually returned to its inoperative position and yet which may be returned with a minimum of effort and difficulty on the part of the user, which will when moved into operative position audibly indicate this by a snapping sound, which is extremely simple in construction, is adapted to the cheapest kind of single ply construction and yet is equally as serviceable and suitable for deluxe multi-ply construction, which is adapted to be formed as an integral part of the structure or as an adjunct attached thereto, which is adapted to be partially or wholly concealed in the structure and which is further adapted to mass production manufacturing methods.

The mount in its most elemental form comprises members which have connected and unconnected portions, the latter normally yieldably resisting separation and a brace located between them for holding them separated so that the separable portions diverge with respect to the connected portions and provide spaced apart feet for supporting the mount on a flat surface. In accordance with a novel aspect of the invention, the brace has two portions of different length hinged together at their adjacent ends and hinged at their opposite ends to the separable parts of the respective members. The hinged adjacent ends of the brace portions are movable from their inoperative position in which the portions are collapsed against each other and lie between the unseparated parts to an operative position in which one of the portions spans the distance between the separated parts, the other being folded against the part to which it is hinged and the hinge between the two bearing against the latter part. The parts are preferably stiff sheet board such as is commonly used for making photograph and calendar mounts, constituting the frame and a leg therefor, and these may be made of single ply or multi-ply construction covered or not as desired.

The invention will now be described with reference to the accompanying drawings wherein:

Fig. 1 is a front elevation of a substantially rectangular photograph mount;

Fig. 2 is a side elevation showing the frame and supporting leg spread apart with a brace holding the parts separated, the latter being shown in full lines in its operative position and in dot and dash lines in a practically inoperative position;

Fig. 3 shows a side elevation of a mount such as shown in Fig. 1, with a modified form of brace;

Fig. 4 is a side elevation of a mount such as shown in Fig. 1, with still another modification of the brace;

Figs. 5, 6 and 7, are fragmentary sections showing various forms of hinges which may be employed for connecting the brace at its ends to the frame and leg;

Fig. 8 is a fragmentary section showing the preferred form of the hinge at the upper end of the leg when it is attached to the frame;

Fig. 9 is a front elevation of a calendar mount for desk use;

Fig. 10 is a side elevation of the calendar mount shown in Fig. 9, showing the brace in operative position;

Fig. 10a is a plan view of the method of making the mount shown in Figs. 9 and 10;

Fig. 10b is a section taken on the line 10b—10b of Fig. 10a;

Fig. 11 is a section on the line 11—11 of Fig. 9, with the frame and leg collapsed, showing the disposition of the brace between the parts in its collapsed condition;

Fig. 12 is a vertical section of the mount shown in Fig. 11, with the frame and leg held spread apart;

Fig. 13 is a rear elevation of a desk calendar mount showing a modified brace provided with a pull tab to assist in moving it into and out of operative position, showing the brace folded in its inoperative position;

Fig. 13a is a fragmentary rear elevation corresponding to Fig. 13 with the brace in its operative position;

Fig. 14 is a side elevation of Fig. 13, showing the brace in operative position;

Fig. 15 is an enlarged vertical section showing the position of the brace parts and operating pull tab when in operative position;

Fig. 16 is a corresponding vertical section showing the brace in its inoperative position with the leg partially collapsed;

Fig. 17 is a vertical section through a mount such as shown in Fig. 13, with a modified brace and pull tab construction;

Fig. 17a is a vertical section corresponding to Fig. 17, with the brace partially collapsed;

Fig. 18 is a rear elevation of a calendar mount provided with a brace and auxiliary elastic strand associated therewith, showing the brace collapsed;

Fig. 19 is a side elevation of the mount shown in Fig. 18, in operative position;

Fig. 20 is a vertical section to larger scale of the mount shown in Fig. 18;

Fig. 21 is a rear elevation corresponding to Fig. 18, with the brace in its operative position; and Fig. 22 is a fragmentary elevation at the upper end of the leg showing means for augmenting the resistance of the leg to rearward deflection.

Referring to the figures, the simplest form of the invention is illustrated in Figs. 1 to 4 inclusive, applied to a conventional photograph mount. As there shown, the mount consists of a stiff substantially rectangular backboard 10, to the front surface of which is applied a face board 12 having a rectangular sight opening 14 through it for framing a photograph placed beneath it against the backboard. The face board 12 may be applied to the backboard by adhesive or stapling and preferably a portion of it adjacent the margin of the sight opening is left unattached so that the edges of the photograph may be inserted thereunder, and thus frictionally held engaged between the face board and backboard. While not illustrated in Figs. 1 to 4, both the face board and backboard, which constitute in combination the frame of the mount may be covered with thin flexible decorative paper-like sheet material and if desired the sheet material may be employed in lieu of adhesive or staples to fasten the parts together as will appear hereinafter in connection with more elaborate forms of the invention. The backboard 10 has connected to it a leg 16 (Fig. 8), which may be flexed with respect to the backboard so that it may be swung from a position in the plane of the backboard to a diverging rearwardly extending position to support the backboard in an upwardly and rearwardly inclined position. In this instance, the backboard 10 and leg 16 are integral, being formed from a single sheet of board folded at 18, to provide the backboard and a leg board 20, to which the leg is appended. The leg board 20, may, however, be independent of the backboard and be fastened thereto, for example, by means of adhesive, staples or the like. The leg board forms a support and anchor for the upper end of the leg 16, which preferably is an integral part thereof. The leg board 20 whether integral with or attached to the backboard may extend all the way across the rear side of the backboard or only a portion of the way across, and the leg may correspond in width to the leg board 20, or be a narrow portion separated therefrom along two sides by spaced cuts extending from some point intermediate the upper and lower edges of the leg board, downwardly to the lower edge so that portions of the leg board at opposite sides of the leg extend all the way down to the bottom edge of the backboard and are secured thereto. The place at which the upper end of the leg 16 flexes with respect to the leg board 20 constitutes a hinge 22 and is so formed as not to destroy the elasticity of the board itself, consequently there is a very marked tendency for the leg 16 when deflected from the plane of the leg board 20 to a divergent position, such as shown in Fig. 2, to return to that plane. This may be accomplished by incising the leg board 20, solely along spaced cuts from its lower edge upwardly a suitable distance and leaving the substance of the material between the upper ends of the cuts in its original condition, so that the leg at its junction with the leg board acts like a simple leaf spring which when deflected tends to return to its straight position by means of the natural resilience and elasticity of the material of which it is made. If instead of incising a narrow leg from the leg board the entire leg board constitutes the leg, the hinged portion will, of course, have the natural resiliency and elasticity of the leg board across its entire width and the hinging action will take place along a line defined by the boundary of the fastened and unfastened portions of the leg board. If an unusually heavy leg board is employed, it may be desirable to emboss or score the leg board or the leg at its upper extremity so that it may be bent rearwardly without cracking the board, although such scoring or embossing should not be so deep or penetrating as to weaken the board since it is essential that there be a strong restorative force acting to resist the deflection and operative to return the deflected leg board or leg to a plane coinciding with the rear face of the backboard in order that the brace will be operative in accordance with the novel features of this invention.

While the substance of the board employed in making the mount is usually sufficiently strong and resilient to provide the desired elasticity or springiness at the hinge 22, it may be desirable to augment the restorative forces by auxiliary spring means. One way of accomplishing this is to fasten an overlay 23 (Fig. 22) astride the hinge so that a portion of it extends upwardly beyond the junction of the leg with the leg board and another portion below it. The upwardly extending portion is attached to the leg board by staples or adhesive and the lower portion is free. The overlay 23 may be a piece of stiff board extending all the way across the leg or only part way across. Alternatively, the overlay may be a light piece of springy material. With a spring strip 23, it is possible to use a lighter gauge material for the leg or even if desired, to score the leg deeply at its junctions so that it has no elasticity of its own or to make a paper hinge such as is shown in Fig. 6, to be described hereinafter.

In the form of the invention shown in Fig. 2, the brace 24 is made of a narrow board cut from and integral with the backboard 10, and the leg 16 in such a manner that it is connected by a hinge 26 to the backboard and a hinge 28 to the leg 16, and that it has an intermediate hinge 30 dividing it intermediate its ends into portions 32 and 34 of different length. When the brace is cut from the material of the backboard and leg, and the latter are comprised of sheet material of a single thickness, the hinges 26 and 28 will be of the kind illustrated in Fig. 5. As there shown the hinge consists merely in bending the brace along the line extending transversely of the parallel cuts forming it, the substance of the material at the hinge being creased, embossed, scored or the like so that it will swing easily on the hinge and will not, as pointed out with reference to the hinge 22, have a residual elasticity or resiliency. The hinge may also be of a kind shown in Fig. 6, wherein there is a gap between the brace and the backboard or leg with which it is associated which is covered or bridged by a thin covering tape applied to the opposite surfaces of the brace and backboard or leg at the place where the hinge is desired or by a decorative covering material applied to the entire surface of the backboard, leg board and brace as will appear in greater detail hereinafter so that the hinge is constituted by the tape or covering paper. The hinge 30 likewise, may also be made by creasing, scoring, embossing or, can be of the kind shown in Fig. 6, so that it has no inherent or residual elasticity.

When the backboard and leg board are made by folding a single sheet double so that the fold 18 is at the top of the mount, the brace 24 is constructed by cutting through the backboard and leg board 20 along spaced, parallel lines *a—a* (Fig. 1) extending from the lower edges *b—b* upwardly to points *c, c'* intermediate the bottom edges and the hinge 22, which are at different distances from the lower edges. As illustrated in Fig. 1, the cuts *a—a* in the backboard are shorter than those in the leg board so that the length of the portion 32 from its lower end to its hinge *c* is shorter than the length of the portion 34 from its lower end to its hinge *c'*. This provides the different length sections 32 and 34. The lower ends of the sections 32 and 34 are joined in suitable fashion to provide the hinge 30. The construction shown in Fig. 6 may be employed.

An alternative method of construction is to fold the face board and leg board from a single piece of board so that the fold line 18 constitutes the lower edge of the mount and then to join the free ends of the folded board to form the upper part of the mount. The brace and leg are formed in this instance prior to folding by cutting the flat blank along spaced, parallel lines in opposite directions from the intermediate fold line different distances *c* and *c'* and then cutting the blank along the line of the fold from the outside edges of the blank inwardly to the brace to divide the backboard and leg from each other and hence to make them separable at the lower edge of the mount. In this case, the hinges 26, 28 and 30 will be constituted by the substance of the board and will be formed merely by creasing, scoring or embossing the substance of the board.

As thus constructed, when the face board and leg are collapsed, that is placed face to face, the portions 32 and 34 of the brace will extend downwardly from their hinges 26 and 28, folding on the hinge 30 and will lie in contact with each other so that the mount is perfectly flat. When the leg 16 is pulled away from the face board the portions 32 and 34 will unfold until they reach a straight line or dead center position with respect to the hinges 26 and 28. At this point there is a tendency for the brace to buckle in either direction from force applied directly along the line of the portions. However, a slight force exerted in a direction to push the hinge 30 across the line extending through the hinges 26 and 28 will move it past dead center whereupon the inherent resiliency of the hinge 22 which tends to restore the leg 16 to its collapsed position will immediately operate to collapse the brace on its hinges 26, 28 and 30. Due to the unequal length of the portions 32 and 34, they cannot fold on the same vertical center line as the backboard and leg, and as a result, the shorter portion 32 is forced into engagement with the backboard to which it is hinged, and the longer portion 34 extends between the backboard and leg, being supported by its hinge 28 on the leg and at its opposite end by the hinge 30 connecting it to the portion 32. It is thus supported by the shorter portion 32 and it in turn applies a force to the shorter portion 32 which prevents it from swinging away from contact with the backboard, so that the brace will not collapse in the opposite direction accidentally or through even very rough or careless handling of the mount. To restore the mount to a collapsed condition, it is necessary to manually grasp the brace close to the hinge 30 and force it downwardly by spreading the leg 16 further from the backboard until it passes the dead center position whereupon the resilience of the leg will swing the parts 32 and 34 downwardly into their collapsed position so that the leg may be brought into contact with the backboard.

Fig. 3 shows a modification of the mount illustrated in Fig. 1, wherein the leg board 20 is an independent piece cut separately from the face board and attached to the rear side of the face board, for example, by adhesive or staple (Fig. 7). The leg board has connected thereto by a hinge 22 a leg 16 of the kind described with reference to Fig. 2. The principal difference is in the brace 24 which is not an integral part of the face board or the leg board, that is it is comprised of a separate narrow strip of board placed between the face board and leg and secured thereto. As illustrated, the brace comprises short and long portions 32 and 34 connected at their adjacent ends by a hinge 30, and at their opposite ends by hinges 26 and 28 to anchoring tabs 36 and 38. The anchoring tabs are fastened to the face board and leg by means of adhesive or stapling. When the leg 16 is collapsed with respect to the face board the portions 32 and 34 will extend downwardly from their hinges 26 and 28 in engagement with each other as previously described with reference to Fig. 2. To place the brace at operative position the leg 16 is swung away from the backboard so as to raise the portions 32 and 34 to dead center position whereupon a flick of the finger in a direction to move the hinge 30 past the dead center will cause the brace to collapse upwardly so as to snap the shorter portion 32 into engagement with the leg 16 and place the longer portion 34 in a bracing position between the backboard and the leg.

While the construction shown in Figs. 2 and 3 illustrate the brace as being comprised of different lengths hinged so that they move from an inoperative position at the base of the frame upwardly through the dead center position to an upper operative position the brace is also operative if inverted, as illustrated in Fig. 4. As shown in this figure, the leg board 20 is secured at its upper end to the backboard 10 and the leg 16 swings rearwardly therefrom on the hinge 22, such as heretofore described. The brace in this instance consists of a short portion 32 and long portion 34 connected at their adjacent ends by a hinge 30 and at their opposite ends by hinges 26 and 28 to anchor tabs 36 and 38. In contradistinction to Fig. 3, the brace is inverted so that when the leg 16 is folded into engagement with the backboard the short and long portions extend upwardly, as shown in dotted lines with respect to their hinge points 26 and 28, and lie in surface contact. In order to set the mount up the leg 16 is pulled rearwardly which straightens the portions with respect to each other whereupon if pressure is applied to the hinge 30 at the dead center point in a downward direction, the shorter portion is immediately caused to collapse against the leg 16, thereby bringing the longer portion 34 into bracing position.

It is to be observed that in any one of the forms of the invention shown in Figs. 1 to 4 inclusive, the essential features of the invention reside in preserving the elasticity and resilience of the leg so that it has a strong tendency to snap back or return to a position in or parallel to the plane of the backboard and in providing a brace consisting of portions of different lengths freely hinged at their ends to the backboard and leg and intermediate their ends to each other. It has been shown above that the device is equally operable and embodies the same principles even when the short and long portions of the brace are reversed or the brace is inverted so that it collapses upwardly rather than downwardly. In the foregoing examples, the backboard may be employed to carry the material to be displayed which may be attached thereto by means of adhesive or staples or there may be mounted thereon one or more facing members in the form of a frame, matte, pocket or overlay for frictionally receiving or holding a photograph or calendar pad.

A somewhat more elaborate construction illustrating the invention and embodying the same novel aspects as heretofore pointed out is illustrated in Figs. 9 to 12 inclusive, showing a desk calendar mount. As there shown the framing member 40 for the calendar pad consists of a backboard 42, to the front face of which there is fastened a face board 44 having in it a substantially rectangular opening 46 for providing in conjunction with the backboard a shallow pocket for receiving a calendar pad which is placed therein and stapled or otherwise fastened to the backboard so that its front face or leaf is substantially flush with the front face of the face board. A leg board 48 is fastened to the upper portion of the backboard at the rear side thereof and has hingedly connected thereto for rearward swinging movement with reference to the backboard a leg 50. A brace 52 is provided having portions 54 and 56 of different length which are connected at their adjacent ends by a hinge 58 and at their opposite ends by hinges 60 and 62 to the backboard and leg board respectively.

In accordance with one mode of manufacture, and for the purpose of securing the necessary elasticity or springiness at the hinge 64, between the leg 50 and the leg board 48 and the flexibility and lack of resilience or elasticity in the hinges 58, 60 and 62, the mount may be constructed as follows: A pair of rectangular boards, $d$, $d'$ (Fig. 10a) of substantially corresponding size and shape are placed end to end on a piece of thin sheet facing material of decorative character $e$ with a space $f$ between the adjacent ends, these boards having previously been prepared with slots $g$, $g'$, parallel to their bases and at different distances therefrom. A second sheet of decorative material $e'$ is then laid across the top of the boards $d$, $d'$ and the boards $d$, $d'$ are adhesively secured between the sheets $e$ and $e'$ by means of heat and pressure. To make the brace, spaced parallel lines $h$—$h$ are then cut through the laminated structure so as to join the corresponding ends of the slots $g$, $g'$ formed in the boards $d$, $d'$. To make the leg, spaced cuts $k$—$k$ are made through the composite extending from the lower edge of one of the boards $d$ to some point intermediate its edges depending upon the length of the leg desired. The substance of the composite between the cuts $h$—$h$ is not cut or weakened by scoring but is left as it is, although in some cases it may be embossed just enough to cause the leg to bend at one place. If desired, the structure may be trimmed to give it a pleasing shape by making cuts $i$ and $j$ which are symmetrical with respect to the bases of the boards $d$, $d'$ and a line perpendicular to the bases midway between their ends to provide suitably shaped symmetrical edges for the finished mount. The boards as thus connected are folded on their bases into contact with each other, the fold line constituting a hinge for the brace portion and consisting of the portions of the facing material $e$, $e'$ extending between the bases at opposite sides. The connecting facing material at the base is cut away to free the lower end of the leg but may be left intact at either side thereof. A third board *d"* corresponding substantially in configuration to the board *d* and *d'* and having a substantially rectangular opening in it, may be placed against the surface of one of the boards *d* and secured thereto. The boards *d*, *d'* and *d"* as thus associated, provide the mount shown in Figs. 9 through 12, in which the board *d* constitutes the leg board 48, the board *d'* the backboard 42 and the board *d"* the face board 44. To improve the appearance of the mount a covering material *e"* of decorative character is applied to the face of the board *d"* so that its marginal edges overlap the end edges of the boards *d* and *d'* at least at the top and sides. The brace, as will be seen, is constituted in part by the board *d* and in part by the board *d'*; these are of different length and are joined at their adjacent ends to each other by the covering material, providing the hinge 58 and at their opposite ends to the backboard and leg by the covering material forming the hinges 60 and 62. The hinge 64 about which the leg 50 swings is preferably embossed slightly so that it bends uniformly as it is swung rearwardly although the embossing may be omitted. If desired, in order to augment the restorative force, the embossing may be made along a curved line.

Instead of placing divided pieces of board *d*, *d'* base to base on the decorative sheet *e*, a continuous strip of board may be delivered for sandwiching between a pair of continuous sheets of covering material, the board having been previously operated upon by suitable punches to make in it suitably spaced groups of cuts corresponding to the gap *f* and slots *g*, *g'*.

While the methods of making the amount as described above are particularly adapted for mass production, it is not to be considered restrictive as it is contemplated that the operations performed in constructing the mount may be carried out in whatever order or sequence desired and which seems most expedient taking into consideration the equipment, help and material available to obtain the ultimate structure without departing from the spirit of the invention.

Figs. 13, 13a, 14, 15 and 16 show a desk-type calendar mount in which the brace is provided with an operative tab to assist one in easily placing the supporting leg in its operative position and in releasing it without having to grasp the brace itself. As shown, the mount has a backboard 68 to which is attached a face board 70 having a rectangular opening therein for the reception of a calendar pad and a leg board 72 to which there is connected by a hinge for swinging movement with reference thereto, a leg 74. The brace 76 consists of portions of different length 78 and 80, connected at their adjacent ends by a hinge 82. The opposite end of the portion 78 is connected by a hinge 84 to the backboard, and a part of the portion 80 intermediate its end is connected by hinge means 86 to the leg 74. The operative length of the portion 80 of the brace constitutes the shorter portion of the brace since it is hinged intermediate its ends so that the distance between the hinge 86 and the hinge 82 is shorter than the distance between the hinge 84 and the hinge 82. The extension 88 of the portion 80 constitutes a pull tab which may be grasped by the operator at the rear side of the leg 74 and which may be pulled rearwardly to swing the leg 74 rearwardly into operative position and then folded downwardly to place the brace in its operative locked position. More exactly, the portion 80 has as an extension thereof, a head 90 (Fig. 13) having laterally spaced shoulders 92—92 which are hinged to the leg 74. To this end, the leg 74 has an opening 94 cut through it through which the head 90 extends, and in the opening are laterally spaced shoulders 96—96 to which the shoulders 92—92 are connected by the hinge means 86—86. The space between the shoulders 96—96 corresponds in width to the width of the portion 80 inwardly of the head so that when the portion 80 is folded into its inoperative position it and the head 90 will lie within the opening 94 flush with the surface of the leg. The parts are so proportioned that when the brace is in its operative position the corners of the portion 80 adjacent the hinge 82 abut the inner side of the leg just above the opening 94 and extend therefrom downwardly and rearwardly through the opening so that the head 90 lies below the opening and closely adjacent to the lower part of the leg. In its inoperative position the parts 78 and 80 extend downwardly from their respective hinges 84 and 86, as shown in Fig. 16, being folded substantially into contact, each part being seated within the thickness of the backboard 68 and leg 74 respectively.

Fig. 17 shows a somewhat modified form of brace in which the shorter portion 80 is hinged to the backboard 68 and the longer portion 78 is hinged to the leg 74. Fig. 17a shows the mount with the brace partially collapsed. The leg 74 has an opening 94 in it like that shown in Fig. 15, through which the longer portion 78 of the brace extends. The brace has as an extension of it a head 90 which provides at its junction therewith, spaced, laterally extending shoulders 92—92. These are connected by hinges 86—86 to the laterally, spaced shoulders 96—96 formed in the opening 94. In the operative position of the brace the hinge 82 between the portions bears against the backboard and the reactive thrust is taken by the hinges 86—86 adjoining or connecting the shoulders 92—92 and 96—96.

In this form of the invention the mount is set up merely by grasping the head 90 and pulling it upwardly and outwardly in contrast to the previously described mount in which the tab is pulled upwardly and then turned downwardly.

In still another form of the invention supplementary elastic means is employed for locking the brace in operative position. The elastic means is optional, however, and when used therewith, it provides a structure which is positively held open under the most severe conditions. The mount as shown in Figs. 18 to 21 has a backboard 98, a face board 100 and a leg board 102 to which there is connected a leg 104 by means of a hinge 106. The brace 108 consists of a short portion 110 and long portion 112 connected at their adjacent ends by a hinge 114 and at their opposite ends by hinges 116 and 118 to the backboard and leg respectively. As will be seen by reference to Fig. 18, the leg 104 is divided from the leg board 102 along lines 120—120 which extend from the bottom of the leg board upwardly toward the top to the hinge 106 and have inwardly curved extremities which form at the hinge 106 of the leg spaced, upstanding tabs 122—122. The longer portion of the brace 112 is divided from the leg by two pairs of spaced, parallel cuts 124—124 and 126—126, joined by laterally extending curved cuts 128—128 which form at the junctions of the lateral cuts downturned tabs 130—130. As thus constructed, the brace may be set into its operative position by pulling the leg 104 rearwardly until the brace portions are on dead center and then shifting the hinge 114 so as to lift it above dead center whereupon the leg will, by its resilient connection to the backboard, force the shorter portion 110 into contact with the backboard. If now desirable to lock the brace more positively in place, a continuous elastic element 132 may be placed in a position to hold the brace more strongly in place than the natural resilience of the leg 104 normally does. For this purpose an elastic band, for example, may be placed so that a portion 134 extends across the upper part of the leg 104 behind the tabs 122—122 downwardly back of the leg parallel to the backboard and beneath the longer portion 112 at its junction with the shorter portion 110 with its lower portion extending under the tabs 130—130. As thus arranged, the downwardly extending portions 134—134 elastically support the hinged adjacent ends of the brace portion 112, exerting an upward pull on it in the plane of the backboard which opposes collapsing the brace in the opposite direction.

In its various forms and modifications, the essential aspects of the invention lie in providing a mount in which the supporting leg is so attached to the frame that it normally lies in the plane of or in contact with the rear side of the frame and resists rearward deflection therefrom so that if it is to be placed at an angular position with reference to the frame so as to provide a supporting leg, it must be positively held in that position in opposition to its natural or some adjunctive means which tends to restore it to its initial position in the plane of or in contact with the frame. While in most of the forms of the invention shown herein the tendency for the leg to return to its inoperative position is afforded by the natural resilience or elasticity of the board of which it is made, advantage being taken of this by leaving the board unbroken so that it acts like a simple leaf spring. It is, of course, possible to use adjunctive means, for example, overlays, light springs or elastic elements for this purpose, although such adjunctive parts would be for the most part too expensive for calendar mounts which must be made cheaply enough so that they can be purchased and distributed free of charge for advertising purposes. In addition to the foregoing, the brace must be constructed of portions of different lengths hinged together at their adjacent ends and at their opposite ends to the frame and leg respectively, and the hinged connections for the brace portions must be, as distinguished from the hinge for the leg, devoid of any inherent resiliency or tendency to resist hinge action. In most instances the arrangement of the brace portions is preferably such that the hinge action takes place by separating the leg and thrusting the hinge at the adjacent ends of the brace portions upwardly toward the top of the mount. However, as illustrated in one form of the invention the brace portions may be arranged to operate in the inverse direction, the only essential element being that the hinged adjacent ends of the brace portions must move across the dead center from their operative to their inoperative position.

This application is a continuation-in-part of my copending application, Serial No. 268,439, filed January 26, 1952, now abandoned.

It should be understood that the present disclosure is for the purpose of illustration only and that this invention includes all modifications and equivalents which fall within the scope of the appended claims.

I claim:

1. A display mount comprising a frame, a leg for supporting the frame in an upright position, means connecting the leg to the back of the frame which yieldingly resists rearward movement of the leg relative to the frame so that normally the leg lies against the back of the frame, a brace for holding the leg distended, said brace comprising arms of unequal length, hinge means connecting the adjacent ends of the arms together, a hinge connecting one end of one arm to the frame, said leg having a hole therethrough at opposite sides of which are spaced shoulders, and said other arm having an extension protruding through the hole having spaced shoulders, and hinge means connecting the spaced shoulders of the arm with the spaced shoulders in the hole.

2. A display mount comprising a support including a face board, an intermediate board and a backboard, means holding the boards in juxtaposition, a part of the rear board being hinged at a fold line at its upper edge to swing into downwardly and rearwardly divergent relation to the remainder of the rear board thereby to form an easel leg, and a two-part brace for holding the easel leg in operative relation, said brace comprising a rear member which initially lies in the plane of the easel leg and is hinged to the latter, and a forward member which initially lies in the plane of the intermediate board and is hinged at its upper end to the latter, said brace members being hinged together at their other ends along a horizontal line which, when the easel leg is folded, lies near the lower edge of the easel leg, that brace member which is hinged to the intermediate board extending upwardly from its hinge line when the easel leg is in operative position, the hinge which connects the brace members then being above a plane defined by the hinges which connect the brace members to the easel leg and intermediate board respectively.

3. A display mount comprising a backboard and a second board disposed forwardly of the backboard and means holding said boards in juxtaposition with their lower edges in registry, an easel leg formed in the backboard by incisions extending upwardly from its lower edge to a fold line above the center of vertical height of the backboard and about which the easel leg may be swung into downwardly and rearwardly divergent operative position, a rear toggle link, initially lying in the plane of the easel leg and united to the latter by a hinge along a horizontal line above the center of height of the easel leg, a front toggle link initially lying in the plane of the second board and which is united to the latter by a hinge along a horizontal line at a height measured from the lower edge of the mount less than the height of the first named horizontal hinge line, hinge means uniting the other ends of the toggle links to each other, the front toggle link extending downwardly from its horizontal hinge connection to the second board when the easel leg is in inoperative position and extending upwardly from its hinge connection to said second board when the easel leg is in operative position.

4. A display mount comprising a backboard and a second board and means holding them in juxtaposition with their lower edges in registry, an easel leg formed in the backboard by spaced incisions extending upwardly from its lower edge to a horizontal fold line, the material of the backboard at said fold line resiliently opposing rearward motion of the lower end of the easel leg, a rear toggle link formed in the lower portion of the easel leg by spaced incisions extending upwardly from the lower edge of the easel leg to a horizontal hinge line located approximately at the midpoint of the easel leg, a forward toggle link formed in the second board by spaced incisions extending upwardly from the lower edge of the second board to a horizontal hinge line located at a vertical height above said lower edge approximating two-thirds the height of the first-named hinge line, a hinge joining the other ends of the two toggle links, the links when in inoperative position extending downwardly from the hinges which connect them to the easel leg and second board respectively and being in face-to-face contact, the two links extending upwardly from the hinge lines which connect them to the easel leg and second boards respectively and the front toggle link lying in face-to-face contact with the rear surface of the second board when the easel leg is in operative position.

5. A display mount comprising a backboard and a second board disposed forwardly of the backboard, means holding said boards in juxtaposition with their lower edges in registry, an easel leg formed in the backboard by incisions extending upwardly from the lower edge of the backboard to a fold line and about which the easel leg may be swung into downwardly and rearwardly divergent operative position, a rear toggle link formed in the easel leg by incisions extending upwardly from the lower edge of the latter to a horizontal hinge line, a forward toggle link formed in the second board by incisions extending upwardly from the lower edge of the latter to a horizontal hinge line, a thin sheet of material covering the rear face of the backboard and the forward face of the second board and a second sheet of thin, flexible material covering the front face of the backboard and the rear face of the second board, portions of each sheet constituting flexible hinge elements for uniting the toggle links to the back and second boards respectively and to each other, there being a gap between proximate edges of the toggle links at the junction of the two toggle links, said gap being bridged by parallel portions of the two thin covering sheets thereby providing a flexible joint between the toggle links such as to permit the toggle links to be folded through an angle of approximately 180°.

6. A display mount comprising a frame, a leg hinged to the frame for supporting the same in an upright position, a brace for holding the leg distended from the frame, said brace comprising rigid arms disposed between the frame and leg with their adjacent ends coterminous, hinge means connecting the coterminous adjacent ends of the arms together, hinge means connecting the opposite end of one arm to the frame and the other to the leg and an elastic strand entrained about the leg and the brace with a portion of it anchored at the leg hinge and another portion at the hinge joining the adjacent ends of the arms of the brace.

7. A display mount comprising a panel board and a leg connected at the rear side thereof so as to be elastically resistant to rearward displacement, and a two-part brace for holding the leg rearwardly displaced in opposition to the elastic resistance of the leg to displacement, said two-part brace comprising a rigid rear brace member which is hinged at one end to the leg and adapted to lie parallel thereto and a rigid forward brace member which is hinged at one end to the panel board and is adapted to lie parallel thereto, said rigid brace members being hinged together at their other ends along a hinge line which when the parts are folded lies on one side of a plane defined by the hinges which connect the brace members to the panel board and leg, and when the parts are angularly disposed lies on the other side of said plane, with one of the brace members paralleling the part to which it is hinged and in contact therewith and the other determining the spacing of the parts.

References Cited in the file of this patent

UNITED STATES PATENTS

| | | |
|---|---|---|
| 289,799 | Barnes | Dec. 11, 1883 |
| 517,444 | Dalsheimer et al. | Apr. 3, 1894 |
| 541,672 | Pappin | June 25, 1895 |
| 758,351 | Cady | Apr. 26, 1904 |
| 1,595,090 | Hart | Aug. 10, 1926 |
| 2,222,665 | Hoenigsberg | Nov. 26, 1940 |
| 2,504,277 | Otterson | Apr. 18, 1950 |
| 2,568,458 | Nichols | Sept. 18, 1951 |
| 2,576,993 | Bergevin | Dec. 4, 1951 |
| 2,654,554 | Cross | Oct. 6, 1953 |
| 2,678,182 | Young | May 11, 1954 |